United States Patent [19]
Chamberlain et al.

[11] Patent Number: 5,254,824
[45] Date of Patent: Oct. 19, 1993

[54] METHOD AND ARTICLE FOR MICROWAVE BONDING OF POLYETHYLENE PIPE

[75] Inventors: Craig S. Chamberlain, Woodbury; Daryl D. Dressler, St. Paul; Brian J. Fish, White Bear Lake, all of Minn.

[73] Assignee: Minnesota Mining and Manufacturing Company, St. Paul, Minn.

[21] Appl. No.: 800,640

[22] Filed: Nov. 27, 1991

Related U.S. Application Data

[63] Continuation-in-part of Ser. No. 588,591, Sep. 26, 1990, which is a continuation-in-part of Ser. No. 335,044, Apr. 7, 1989, abandoned.

[51] Int. Cl.$^5$ ............................................. H05B 6/64
[52] U.S. Cl. ...................... 219/10.57; 219/10.55 F; 219/10.55 M; 219/10.59; 219/10.61 R; 219/10.61 A; 219/8.5; 219/9.5; 156/272.2; 156/272.4; 156/379.6; 285/187; 285/286; 428/323; 428/328
[58] Field of Search .................. 219/10.55 E, 10.55 F, 219/10.55 M, 6.5, 8.5, 9.5, 10.57, 10.59, 10.61 R, 10.61 A; 156/272.2, 272.4, 274.8, 285, 379.6; 285/187, 188, 189, 286; 403/25, 172, 222, 270, 271, 272; 428/323, 324, 328

[56] References Cited

U.S. PATENT DOCUMENTS

| | | | |
|---|---|---|---|
| 3,022,209 | 2/1962 | Campbell | 156/272 |
| 3,143,364 | 8/1964 | Klein | 285/55 |
| 3,519,517 | 7/1970 | Dench | 156/380 |
| 3,574,031 | 4/1971 | Heller, Jr. et al. | 156/273 |
| 3,620,875 | 11/1971 | Guglielmo et al. | 156/272 |
| 3,647,592 | 3/1972 | Woodberry | 156/285 |
| 3,657,038 | 4/1972 | Lightfoot | 156/106 |
| 3,709,775 | 1/1973 | James | 161/162 |
| 3,730,804 | 5/1973 | Dickey | 156/272 |
| 3,749,621 | 7/1973 | Shoffner | 156/272 |
| 3,802,985 | 4/1974 | Leatherman | 156/244 |
| 3,826,521 | 7/1974 | Wilhelmsen | 285/15 |
| 3,996,090 | 12/1976 | Leatherman | 156/244 |
| 4,067,765 | 1/1978 | Heller, Jr. et al. | 156/272 |
| 4,345,785 | 8/1982 | Bradford | 285/286 |
| 4,486,650 | 12/1984 | Bridgstock et al. | 219/544 |
| 4,544,600 | 10/1985 | Kern | 428/323 |
| 4,618,525 | 10/1986 | Chamberlain et al. | 428/209 |
| 4,623,565 | 11/1986 | Huybrechts et al. | 428/324 |
| 4,624,798 | 11/1986 | Gindrup et al. | 252/62.54 |
| 4,626,642 | 12/1986 | Wang et al. | 219/10.55 |
| 4,749,833 | 6/1988 | Novorsky et al. | 219/10.43 |
| 4,762,864 | 8/1988 | Goel et al. | 523/428 |
| 4,906,497 | 3/1990 | Hellmann et al. | 428/49 |
| 5,021,293 | 6/1991 | Huang et al. | 428/328 |

FOREIGN PATENT DOCUMENTS

| | | | |
|---|---|---|---|
| 1237970 | 6/1988 | Canada | 154/107.2 |
| 54-58777 | 5/1979 | Japan | |
| 61-171783 | 8/1986 | Japan | |
| US88/02909 | 6/1989 | PCT Int'l Appl. | |

OTHER PUBLICATIONS

"Electromagnetic Bonding of Thermoplastics" by M. Chookazian, published Sep. 1975, issue of Plastics Design & Processing, pp. 18–20.

U.S. patent application Ser. No. 07/668974 filed on Mar. 13, 1991.

U.S. patent application Ser. No. 07/423220 filed on Oct. 18, 1989.

Primary Examiner—Bruce A. Reynolds
Assistant Examiner—Tu Hoang
Attorney, Agent, or Firm—Gary L. Griswold; Walter N. Kirn; Jack V. Musgrove

[57] ABSTRACT

A method and article for microwave bonding of thermoplastic pipe such as that used in the distribution of natural gas. The article is a composite bonding material (CBM) having a thermoplastic matrix (preferably polyethylene) which is miscible with the thermoplastic material of the pipe, and a plurality of microwave susceptor particles dispersed throughout the matrix. The preferred susceptors have improved heating properties whereby the total amount of metal oxide material in the CBM is about 1/10 of 1% by weight. A strip or sleeve is fashioned from the CBM and may be used, with or without a coupling, to join two pipes or repair ruptures. The method includes positioning of the article at the pipe joint or rupture, and application of microwave energy in an amount sufficient to heat the susceptors and cause both the CBM matrix and the adjacent portion of the pipe to melt and flow together, thereby producing a fusion bond.

9 Claims, 2 Drawing Sheets

METHOD AND ARTICLE FOR MICROWAVE BONDING OF POLYETHYLENE PIPE

CROSS-REFERENCE TO RELATED APPLICATIONS

This application is a continuation-in-part of pending U.S. patent application Ser. No. 07/588,591 filed Sep. 26, 1990, which is a continuation-in-part of U.S. patent application Ser. No. 07/335,044 filed Apr. 7, 1989, now abandoned.

BACKGROUND OF THE INVENTION

1. Field of the Invention

The present invention generally relates to methods and devices used to attach structural members, and more particularly to a method and article for fusion bonding conduits formed of polyolefin materials, such as polyethylene pipes used for natural gas distribution.

2. Description of the Prior Art

Conventional distribution systems for natural gas use polyethylene pipes of varying diameters to transport the gas from suppliers to end users. There is a continual problem regarding leakage in such pipe systems due to inadequate joining of pipe sections, or due to ruptures which may occur in the pipes after placement in the ground. Such joining, and repair of ruptures, was at one time accomplished by the use of various adhesives (see, e.g., U.S. Pat. No. 3,826,521), but this was generally unacceptable due to the difficult adherence characteristics of polyethylene which would result, after a long period of time, in cracks in the cured adhesive or separation of the adhesive from the pipe surface. Indeed, bonding nearly anything to polyethylene is very difficult, as recognized in U.S. Pat. No. 3,143,364.

Another technique for fitting pipes together involves the use of electro-fusion couplers (see, e.g., U.S. Pat. No. 4,486,650). These couplers overcome the adherence properties of the polyolefin compositions by being formed of the same thermoplastic material as the conduits to be joined. An electrical resistance heating element is molded into the coupler, along the inner surface thereof, and upon energization of the element by direct current, it raises the temperature of the thermoplastic material in both the coupler and the adjacent pipes which have been fitted within the coupler. The material of the coupler and the pipes then flows together and fuses as it cools. As with other prior art techniques, however, electrofusion couplers often do not create a complete seal and the entire process must sometimes be repeated. Electrofusion couplers are also relatively expensive and consequently have not gained widespread use.

Fusing of the pipes may also be accomplished by the use of special films which may be applied to the joint or rupture and heated to flow with the pipe material. For example, Patent Cooperation Treaty Application US88/02909 depicts a method of applying a conductive, polymeric gasket to a pipe joint, and heating the gasket by passing electrical current therethrough. A similar process is disclosed in Japanese Patent Application (Kokai) No. 54-58777 which uses a dielectric heater to melt a conductive sheet which has been wrapped around the pipes. One disadvantage of these techniques is that they require a relatively high conductivity, further requiring the use of metallic or carbonaceous fillers. The inclusion of these fillers in the bonding matrix causes the bond to be more brittle which can lead to cracking over a long period of time. The concern over the use of these fillers in the bonding material is highlighted by the industry (ASTM & Plastic Pipe Institute) requirement that metallic particles be present in an amount not greater than 1% by weight. An equally significant disadvantage relates to the power supply required for these fusion bonding techniques. Dielectric heating requires special electrode pairs and equipment that is both heavy and bulk, which makes it much more difficult to use in the environment of a gas pipe trench. It would, therefore, be desirable and advantageous to devise a method for bonding polyolefin pipes which would both simplify the bonding process and provide a bonding material which would be acceptable to the gas distribution industry.

SUMMARY OF THE INVENTION

The foregoing objectives are achieved in a method of bonding conduits formed of a thermoplastic polymer by applying a strip of microwave-heatable, composite bonding material to the conduit and applying microwave energy to the material. The composite bonding material (CBM) is comprised of (i) a thermoplastic polymer matrix which is miscible with the polymeric material of the conduit, and preferably the same as the material of the conduit, and (ii) a microwave susceptor material dispersed throughout the CBM matrix. The particular susceptors used have improved heating properties whereby the total amount of metal material in the CBM is as low as 1/10 of 1% by weight.

The CBM may be formed into cylindrical sleeves which may be placed about the end portions of two pipes to be joined, and the pipe ends then placed in a standard coupling, followed by microwave irradiation. Alternatively, an article is also provided to simplify this process by providing the CBM sleeves prepositioned along the inner surface of the coupling. Similar CBM sleeves or strips may be used to repair ruptures in an intermediate portion of the pipe or to repair existing joints which have developed cracks.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
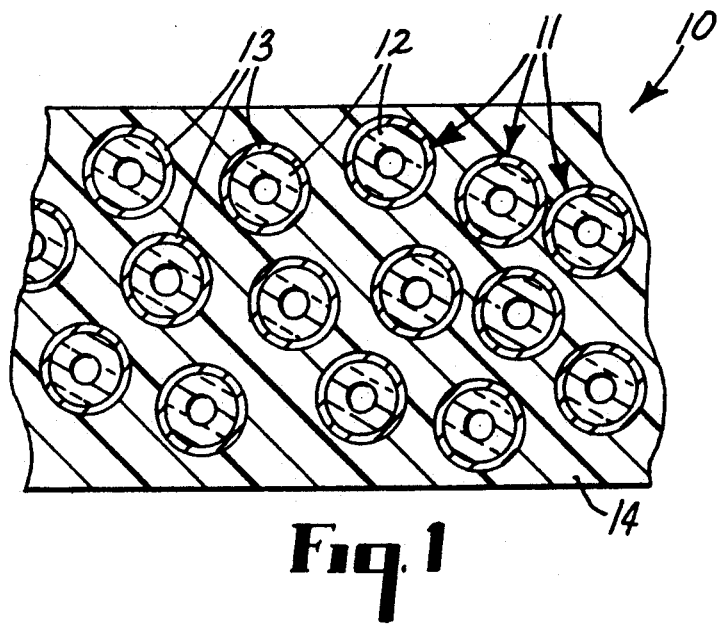
FIG. 1 is an enlarged elevational section view of a composite bonding material according to the present invention.

With reference now to the figures, and in particular with reference to FIG. 1, there is depicted, in a section view, a strip 10 of the composite bonding material (CBM) of the present invention. The CBM is generally comprised of a plurality of susceptor particles 11 which are formed from a substrate 12 having one or more coatings 13 thereon, the particles 11 being dispersed in a matrix 14. Additional details regarding various susceptor particles and matrix materials may be found in the parent application, Ser. No. 07/588,591, the disclosure of which is incorporated by reference. Disclosed matrix materials include silicone, silicone rubbers, and hot melt powders. Disclosed susceptor substrates include glass, mica, ceramic, polymers and adhesives, able to receive and support a coating of a thin, continuous, conductive or semi-conductive film. Disclosed substrate coatings include conductive and semiconductive materials having an electrical resistivity in the range of $10^{-6}$ ohm-cm to $10^7$ ohm-cm, and preferably resulting in a susceptor particulate having a bulk power resistivity in the range of $10^{-2}$ ohm-cm to $10^8$ ohm-cm; preferred coating materials include tungsten, zirconium, copper, iron, titanium, chromium, silver, molybdenum and aluminum, as well as metal oxides, nitrides, carbides, silicides, borides and phosphides. Coating thickness is most preferably in the range of 1-100 Angstroms. The susceptor substrates may be coated using the same technique (viz., vapor deposition, as in sputtering or vapor coating) as described in U.S. Pat. No. 4,618,525, which is also incorporated by reference.

The present invention is directed to use of the CBM for the purpose of bonding thermoplastic conduits, particularly polyethylene pipes which are used in the distribution of natural gas. The terms "join" and "bond" as used herein contemplate not only the creation of a new joint, as at end fittings and T-joints of the pipes, but also the repair (patch) of an old joint or a rupture in an intermediate portion of a pipe. Also, the term "pipe" refers to any conduit regardless of its size or cross-sectional shape.

Figure 2:
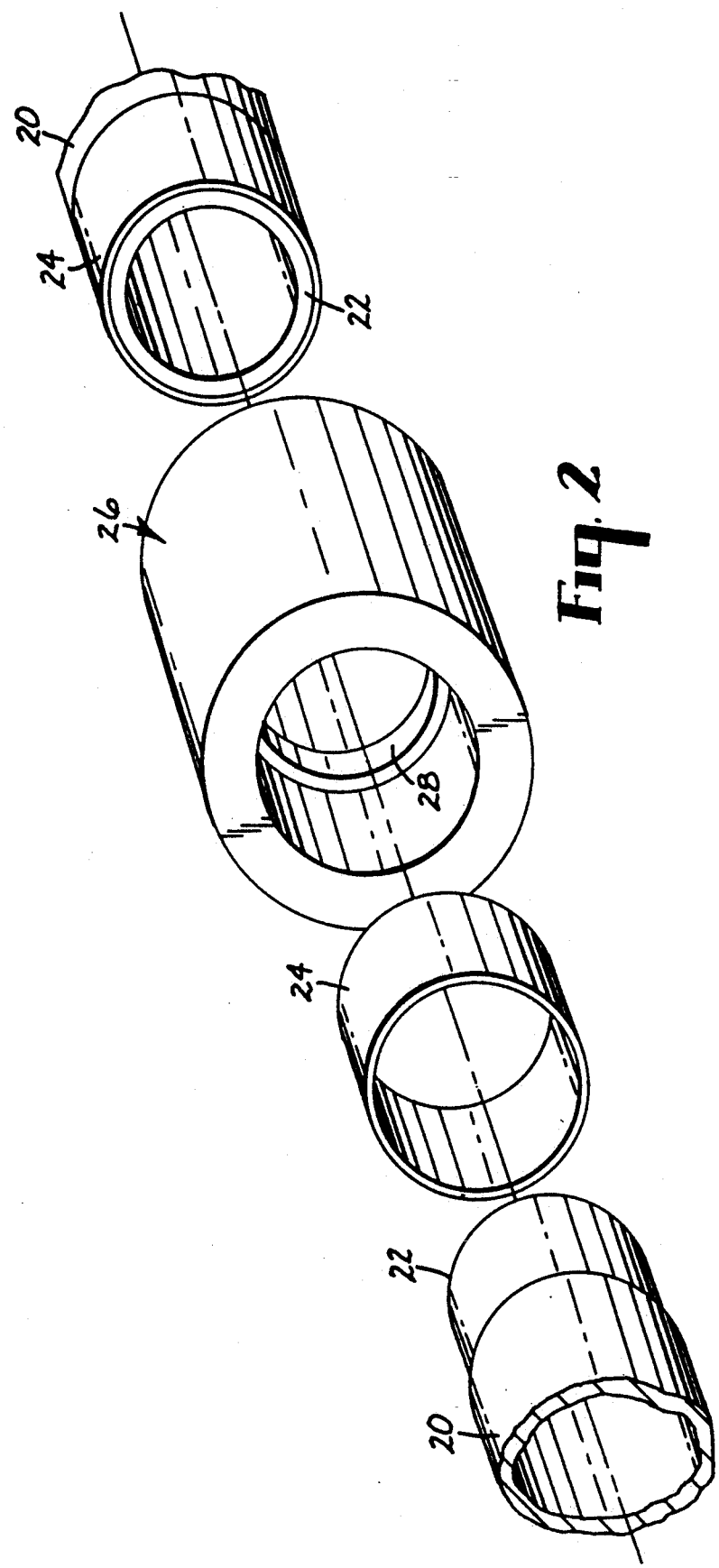
FIG. 2 is a perspective view depicting a method of applying sleeves of composite bonding material to the ends of two pipes in order to join them with a coupler according to the present invention.

Referring now to FIG. 2, one method of joining two pipes with the CBM of the present invention is explained. Two pipes 20 are provided, the ends 22 of Which have been milled along their outer surface to provide end portions having a slightly smaller outer diameter than the remainder of pipes 20. The amount of milling of the outer surfaces is approximately equal to the thickness of the sleeves 24 which are formed of the CBM of the present invention. Sleeves 24 are fitted around the milled end portions, and the ends 22 of each pipe 20 are then inserted into a conventional pipe coupling 26.

Coupling 26 is generally a hollow cylinder designed to receive pipes 22, i.e., the cross-sectional shape and size of the inner wall of coupling 26 is approximately the same as that of the outer walls of pipe 22. In this regard, it is understood that coupling 26 may be of different sizes and shapes according to the dimensions of pipes 20 and, furthermore, two pipes of different sizes (or shapes) may be joined by using a coupling which has two different inner diameters (or cross-sectional shapes) at each end thereof. Coupling 26 preferably has an annular flange 28 along its inner wall at the approximate center thereof in order to ensure that pipes 22 are inserted the proper distance into coupling 26.

Once the pipes are so inserted (with sleeves 24 fitted in place), microwave energy may be applied to the assembled joint, causing susceptor particles 11 to rapidly heat up. It is anticipated that a microwave applicator having a clamshell design whereby it may be placed about the joint will provide acceptable microwave radiation in a field environment. Such an applicator would use a power supply similar to that sold by Gerling Laboratories of Modesto, California, under model number GL137R. This in turn causes sleeve 22 to melt, and further causes a portion of ends 22 of pipes 20 to melt along the outer surface thereof, and similarly causes a portion of coupling 26 to melt along the inner surface thereof, adjacent to sleeve 22. After the microwave applicator is turned off, the so-melted portions quickly cool off, fusing together as they cool to create a unified joint. The material for matrix 14 is thus preferably miscible with both the material of pipes 20 and the material of coupling 26.

This technique presents many advantages over prior art bonding methods and materials. First of all, it is relatively inexpensive and foolproof as compared to electrofusion couplers and, if the process results in an incomplete bond, the technician may simply reenergize the microwave applicator to reheat the joint and provide a more complete seal. The resulting joint clearly imparts a much stronger bond than adhesives since the CBM has physically fused with the material in the pipes and the coupling. There is also less power consumption than with other fusion bonding techniques since the heating is concentrated directly at the interface between the coupling and the pipes, which further prevents distortion of the bulk of the pipe or coupling due to overheating. Furthermore, use of the foregoing techniques provides the unexpected result of a mechanical locking action between the pipe and the coupling. Due to thermal expansion, the outer diameter of the pipe has been found to increase slightly, i.e., the end of the pipe becomes flared. Due to the heating of the inner surface of the coupling, this effect results in deformation of the coupling so that the pipe end digs into the pipe coupling, greatly improving the strength of the joint. This locking effect may also advantageously be used in joining two pipes of slightly different diameters (i.e., one pipe has an inner diameter slightly greater than the outer diameter of the second pipe), by positioning a sleeve of CBM material about the end of the smaller pipe and inserting it into the larger pipe. After heating the CBM, the end of the inner pipe will become flared and expand into the outer pipe. Finally, use of the specific susceptor particles and matrix materials as taught herein results in a joint which has a very small amount of metallic material, as little as 1/10 of 1% by weight, which satisfies the rigorous requirements of the gas industry. Of course, the CBM may be compounded to include as much as 1% by weight of metallic material.

The particular dimensions of the sheet or strip formed by the CBM may vary considerably according to the intended use. For example, in the application shown in FIG. 2, it is clear that the circumference of the sleeve must be equal to the outer circumference of the milled portion of the pipe, while the width of sleeve 22 would be approximately equal to the distance from the edge of the coupling 26 to annular flange 28. The thickness of the CBM material may vary within the range of about 0.1 to 10 mm, again depending upon the particular application and the required degree of heating and bonding.

Figure 3:
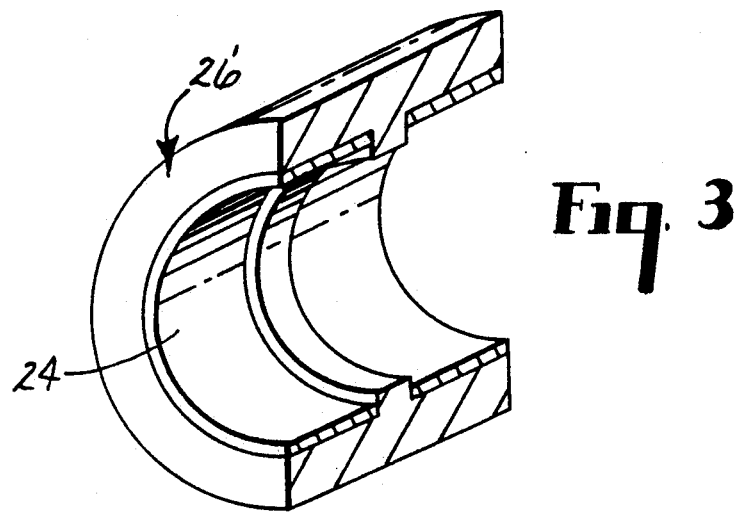
FIG. 3 is a perspective section view of a pipe coupler having composite bonding material along its inner surfaces according to the present invention.
Figure 4:
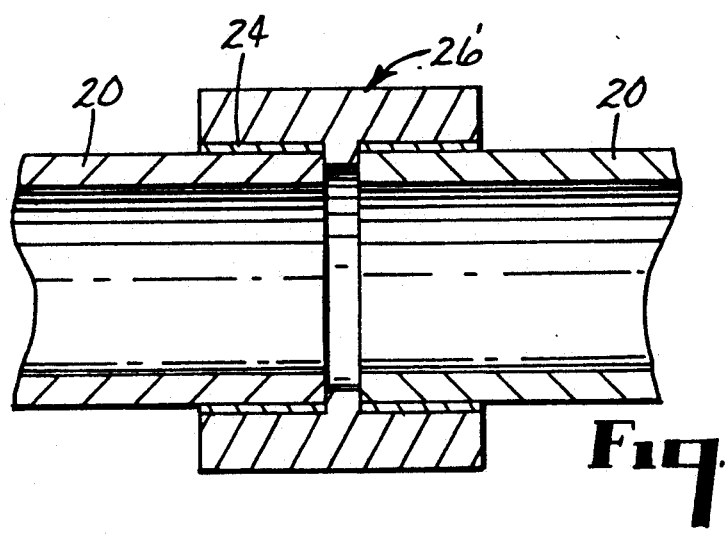
FIG. 4 is an elevational section view showing two pipes joined with the coupler of FIG. 3.

An alternative method of joining pipe ends is illustrated in FIGS. 3 and 4. In this method, a coupling 26' is used which has an inner diameter slightly greater than the normal outer diameter of the pipes. This allows the prepositioning of the CBM sleeves within coupling 26', reducing the technician's task to one of (i) inserting the pipes in the coupling, and (ii) applying the microwave energy. Those skilled in the art will recognize techniques similar to those described above for effecting T-joints as well as patching ruptures or cracks at an intermediate portion of the pipe, and will further recognize other joining techniques in general which may utilize the CBM of the present invention to effect microwave bonding of the joints, for example, butt welding (with the pipe ends flush). Two identical pipes may also be joined without butt welding by milling the outer surface of the end of one pipe, thereby reducing the outer diameter of that end, and milling the inner surface of the end of the other pipe, thereby reducing the inner diameter of that end; the pipe with the milled outer surface may then be inserted into the pipe with the milled inner surface and, of course, a sleeve of CBM is interposed between the pipe ends.

For the specific use contemplated herein, the preferred composition of the CBM includes a medium or high density polyethylene matrix, similar to the polyethylene material used to form the gas distribution pipes. The susceptor particles are preferably glass fibers having a tungsten coating with an aluminum suboxide overcoating. Alternatively, the substrate for the susceptors may be polyethylene beads, which further reduces the amount of "contamination" (i.e., non-polyolefinc material) in the joint. The CBM strips may also be provided with a plurality of holes in grid fashion, whereby thermoplastic material from pipe or coupling actually penetrates through the CBM and fuses directly with the material on the other side of the CBM.

Antistatic characteristics may be imparted by, e.g., overcoating the exemplary susceptor particles with an additional coating of copper oxide and increasing the volume loading of the susceptors. Depending upon the loading, this will impart a resistivity of the CBM as low as $10^9$ ohm-cm, but it may cause the CBM to have a higher metal content than that required by industry standards.

Other alternative compositions for the CBM will become apparent to those skilled in the art upon reference to the following examples. In these examples, the glass fibers used were Owens-Corning 739-DD 1/16 inch available from Owens-Corning Fiberglass Corp. of Toledo, Ohio. The mica flakes used were SUZORITE ™ 200 HK available from Marietta Resources International, Ltd. of Hunt Valley, Md. The CBM was produced by either mixing susceptor particles 11 with the desired matrix material 14 and hot pressing the so compounded material into a thin sheet or strip, or by direct extrusion of the mixture into a thin sheet. The thickness of these CBM inserts was 1.0 mm.

All of the pipe joints to be bonded consisted of a nominal 2" polyethylene coupling with the inside diameter enlarged (by approximately 2 mm) to accept a cylindrical insert of the CBM and still allow the insertion of a piece of nominal 2" polyethylene pipe into each side. The pipe was inserted 25 mm into the coupling. The CBM insert was applied to the joint to be fusion bonded and then the assembly was heated by microwave energy in an Ammana RC/20SE microwave oven at a power of approximately 2 KW for the times stated. After fusion bonding, produced by interaction between the applied microwave energy and the CBM, the assemblies were sectioned along their longitudinal axes into four pieces for examination and testing. The bend test referred to is an industry standard 90° bend test described in Plexco-Chevron Bulletin 105Y and is a severe test of the bonded joints. "LDPE" means low density polyethylene (D=0.910 to 0.925 g/cm$^3$), "MDPE" means medium density polyethylene (D=0.926 to 0.940 g/cm$^3$), and "HDPE" means high density polyethylene (D=0.941 to 0.959 g/cm$^3$).

EXAMPLE 1

LDPE with Coated Glass Fibers

Glass fibers were sputter coated with 3.4 nanometers of tungsten and overcoated with 15 nanometers of aluminum suboxide. A linear LDPE, Union Carbide HS-7064, was compounded in a HaakeBuchler RHEOCORD ™ System 40 with 10% by volume of the so coated glass fibers. This CBM was hot pressed into a 1.0 mm sheet. The inside diameter of a pipe coupling, AF08-14 21PS, made from Dupont ALDYL ™ "A" PE2406 polyethylene resin was bored out to accommodate a cylindrical insert of the CBM. A piece of Dupont ALDYL ™ "A" pipe was inserted into each side of the coupling. The assembly was placed into the microwave oven for 1.5 minutes. The fusion bonded assembly was visually inspected and showed evidence of melting at the interface between the pipe and the coupling. The assembly was sectioned along the longitudinal axis into four pieces. All visible bond lines appeared uniform and consistent throughout. One section was subjected to the bend test and passed.

EXAMPLE 2

MDPE with Coated Mica Flakes

Mica flakes were sputter coated with 0.34 nanometer of tungsten and overcoated with 2 nanometers of aluminum suboxide. A MDPE, Chevron 9301-T, was compounded with 10% by volume of the so coated mica flakes and hot pressed into the CBM. A yellow Plexco PE 2406 polyethylene straight-through coupling with the above CBM inserts and two pieces of yellow Plexco PE2406 pipe were assembled and placed in the microwave oven for 2.0 minutes. After fusion bonding, the assembly was sectioned. The bond appeared uniform and consistent throughout.

EXAMPLE 3

MDPE with Coated Mica Flakes

Mica flakes were sputter coated with 0.34 nanometer of tungsten and overcoated with 2 nanometers of aluminum suboxide. A MDPE, Chevron 9301-T, was compounded with 15% by volume of the so coated mica flakes and hot pressed into the CBM. This CBM was used to form the assembly of pipe and coupling of Example 2 which was then fusion bonded by placing it in the microwave oven for 1.0 minute. The assembly was sectioned into four parts and the bonds appeared to be uniform and consistent throughout.

EXAMPLE 4

MDPE with Coated Glass Fibers

Glass fibers were sputter coated with 7.3 nanometers of tungsten overcoated with 15 nanometers of aluminum suboxide. A MDPE, Chevron 9301-T, was compounded with 5.4% by volume of the coated fibers using a 2" Baker Perkins co-rotating twin-screw extruder. The polymer was introduced into the extruder using a K-Tron T-35 feeder. A 20 cc Zenith flow through polymer gear pump was used to develop the pressure necessary to force the mixture through a standard 6" single lip die with a die opening of about 0.020". The extruded material was then introduced into a nip formed by a rubber roller running against a steel roll, both chilled by tap water. Standard web handling equipment was used to wind the material onto take-up rolls. An orange Wayne Mfg. straight-through polyethylene coupling, 500238238081 PE2406, with the above CBM inserts, and two pieces of orange Driscopipe PE2406 polyethylene pipe were assembled and placed in the microwave oven for 4.0 minutes. No fusion bonding or melting occurred. It is therefore believed that this example establishes an overall lower limit for fusion bonding involving the parameters of % particle loading, particle heating performance, CBM thickness, and watt-seconds of applied energy.

EXAMPLE 5

MDPE with Coated Glass Fibers

Glass fibers were sputter coated with 3.4 nanometers of tungsten overcoated with 15 nanometers of aluminum suboxide. A MDPE, Chevron 9301-T, was compounded, using the extrusion process of Example 4, with 14.1% by volume of the coated glass fibers to make the CBM. Two pieces of black Plexco yellow stripe PE3408 HDPE pipe and a black Plexco straight-through coupling were assembled, after scuffing the pipe ends with emery cloth, using the above CBM and placing the assembly in the microwave oven for 1.5 minutes. Melting was very evident around the circumference at the interface between the coupling and the pipe. The assembly was sectioned and the bonds appeared uniform and consistent throughout. A section was subjected to the bend test and passed.

EXAMPLE 6

MDPE with Coated Glass Fibers

Glass fibers were sputter coated with 3.4 nanometers of tungsten overcoated with 15 nanometers of aluminum suboxide. A MDPE, Chevron 9301-T, was compounded, using the extrusion process of Example 4, with 14.1% by volume of the coated glass fibers to make the CBM. Two pieces of yellow Plexco PE2406 pipe and a yellow Plexco PE2406 straight-through coupling were assembled with the above CBM inserts and placed in the microwave oven for 45 seconds. The assembly was sectioned and visual examination showed the bonds to be uniform and consistent throughout. A section was subjected to the bend test and passed.

EXAMPLE 7

MDPE with Coated Glass Fibers

Glass fiber was sputter coated with 7.3 nanometers of tungsten overcoated with 15 nanometers of aluminum suboxide. A MDPE, Chevron 9301-T, was compounded, using the extrusion process of Example 4, with 19.5% by volume of the coated glass fibers to make the CBM. Two pieces of yellow Plexco PE2406 pipe and a yellow Plexco PE2406 straight-through coupling were assembled with the above CBM inserts and placed in the microwave oven for 2.5 minutes. The assembly was sectioned and the bond appeared to be uniform and consistent throughout and one section was subjected to the bend test and passed.

EXAMPLE 8

MDPE with Coated Glass Fibers

Glass fibers were sputter coated with 7.3 nanometers of tungsten overcoated with 15 nanometers of aluminum suboxide. A MDPE, Chevron 9301-T, was compounded, using the extrusion process of Example 4, with 19.5% by volume of the coated glass fibers to make the CBM. Two pieces of yellow Plexco PE2406 pipe and a yellow Plexco PE2406 straight-through coupling were assembled with the above CBM inserts and placed in a Litton GENERATION II TM, 700 watt microwave oven for 7.0 minutes. The assembly was sectioned and the bond appeared to be uniform and consistent throughout, and one section was subjected to the bend test and passed. These last two examples illustrate that the heating performance of the particles together with the watt-seconds of applied energy determine suitable welding conditions. These particles are not as efficient as some others used, i.e. the particles of Example 8, and therefore require a longer heating time. The required energy application time is scaled according to the inverse of the microwave source power ratios.

EXAMPLE 9

HDPE with Coated Glass Fibers

Glass fibers were sputter coated with 2.6 nanometers of tungsten overcoated with 15 nanometers of aluminum suboxide. A HDPE, Chevron HiD TM 9006-T, was compounded using the extrusion process of Example 4 with 10.3% by volume of the coated glass fibers to form CBM #1, and was also compounded using the extrusion process of Example 4 with 14.1% by volume of the same coated fibers to form CBM #2. Two pieces of orange Driscopipe PE2406 and a Central PE2406 straight-through coupling were assembled with a CBM #1 insert on one side and a CBM #2 insert on the second side. The CBM was approximately 0.76 mm thick. The assembly was placed in the microwave oven for 1.5 minutes. The assembly was sectioned and the bonds appeared to be uniform and consistent throughout, and one section was subjected to the bend test and both sides passed without any evidence of failure.

EXAMPLE 10

HDPE with Coated Glass Fibers

Glass fibers were sputter coated with 2.6 nanometers of tungsten overcoated with 15 nanometers of aluminum suboxide. A HDPE, Chevron HiD TM 9006-T, was compounded using the extrusion process of Example 4 with 20.4% by volume of the coated glass fibers to form the CBM. Two pieces of orange PE2406 Driscopipe and a Central PE2406 straight through coupling were assembled using an insert of the 20.4% CBM on one side and an insert of the 14.1% CBM from Example 9 on the other side. The assembly was placed in the microwave oven for 1.5 minutes. The assembly was sectioned and the bond appeared to be uniform and consistent throughout. One section was subjected to the bend test and both sides passed. No evidence of cohesive or adhesive failure was observed.

EXAMPLE 11

HDPE with Coated Mica Flakes

Mica flakes were sputter coated with 5.7 nanometers of 304 stainless steel. A HDPE, Dow 8054, was compounded by the extrusion process of Example 4 with 7.4% by volume of the coated particles to produce the CBM. Two pieces of orange PE2406 Driscopipe and a Wayne Mfg. 500238238081 PE2406 straight-through coupling were assembled with the above CBM inserts and the assembly was placed in the microwave oven for 2 minutes. The cured assembly was sectioned and the bond appeared uniform and consistent throughout.

EXAMPLE 12

HDPE with Coated Mica Flakes

The assembly was the same as in Example 11. The assembly was subjected to the microwave for 3.0 minutes. The assembly was sectioned and the bond appeared uniform and consistent throughout.

EXAMPLE 13

HDPE with Coated Mica Flakes

The assembly was the same as Example 11. The assembly was subjected to the microwave oven for 4.0 minutes. The assembly was sectioned and the bond line appeared uniform and consistent throughout, but other areas showed evidence of overheating.

EXAMPLE 14

HDPE with Coated Mica Flakes

Mica flakes were sputter coated with 0.34 nanometer of tungsten and overcoated with 2 nanometers of aluminum suboxide. A HDPE, Chevron HiD TM 9006-T, was compounded as in Example 1 with 10% by volume of the coated particles to produce the CBM. Two pieces of orange PE2406 Driscopipe and a Wayne Mfg. orange PE2406 straight-through coupling were assembled with the above CBM inserts and the assembly was placed in the microwave oven for 1.5 minutes. The assembly was sectioned and the bond appeared to be uniform and consistent throughout.

EXAMPLE 15

HDPE with Coated Mica Flakes

The assembly was similar to Example 14 except that 5% by volume coated mica was used in the CBM. The assembly was placed in the microwave oven for 3 minutes. The external appearance of the weld looked very good. The CBM flowed well and good melting was evidenced after sectioning with the bond appearing to be uniform and consistent throughout.

EXAMPLE 17

HDPE with Coated Mica Flakes

Mica flakes were sputter coated with tungsten and overcoated with aluminum suboxide. A HDPE, Chevron HiD TM 9006-T, was compounded as in Example 1 with 20% by volume of the coated particles to produce the CBM. A 3" outer diameter polyethylene pipe was fitted with two polyethylene end caps and CBM inserts, and fusion bonded. A hole was bored into one cap and a pressure tube tapped therein. The assembly was pressure-tested by applying increasing amounts of gas pressure. The pipe section visibly expanded under an applied pressure of 700 psi, but there was no apparent rupture of either cap seal. A second pipe section was similarly assembled with two end caps, and similarly tested, but to higher pressures. The pipe section developed a rupture at an intermediate portion of the pipe, but the fusion joints remained intact.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. An article for bonding to a polyolefin pipe comprising a strip of composite bonding material formed of a plurality of susceptor particles dispersed in a polyolefin matrix, said susceptor particles comprising a substrate substantially non-reflective of microwave energy and a coating on said substrate absorptive of microwave energy, said coating having a thickness in the range of 1-100 Angstroms and having an electrical conductivity in the range of $10^{-6}$ to $10^7$ $\Omega$-cm, resulting in said susceptor particles having a bulk resistivity in the range of $10^{-2}$ to $10^8$ $\Omega$-cm.

2. The article of claim 1 wherein said polyolefin matrix is polyethylene.

3. The article of claim 1 wherein said strip of composite bonding material is fashioned into a sleeve.

4. The article of claim 1 wherein said substrate of said susceptor particles comprises milled glass fibers.

5. The article of claim 1 wherein said substrate of said susceptor particles comprises mica flakes.

6. The article of claim 1 wherein said coating of said susceptor particles includes metallic material.

7. The article of claim 1 wherein said coating of said susceptor particles includes a first coating of a metallic material, and a second overcoating of a metal oxide material.

8. The article of claim 6 wherein said metallic material is present in said composite bonding material in an amount not exceeding about 1% by weight.

9. The article of claim 6 wherein said metallic material is present in said composite bonding material in an amount not exceeding about 1/10 of 1% by weight.

* * * * *